(12) United States Patent
Chen

(10) Patent No.: US 8,382,621 B2
(45) Date of Patent: Feb. 26, 2013

(54) ELECTRICAL DRIVE APPARATUS FOR VALVES

(75) Inventor: Shui-Ching Chen, Taichung (TW)

(73) Assignee: Sun Yeh Electrical Ind. Co. Ltd., Lung Ching Township, Taichung (TW)

( * ) Notice: Subject to any disclaimer, the term of this patent is extended or adjusted under 35 U.S.C. 154(b) by 280 days.

(21) Appl. No.: 12/954,807

(22) Filed: Nov. 26, 2010

(65) Prior Publication Data

US 2012/0135833 A1    May 31, 2012

(51) Int. Cl.
*F16H 3/72* (2006.01)
*F16H 37/06* (2006.01)

(52) U.S. Cl. .......................................................... 475/4

(58) Field of Classification Search .................. 475/3, 4, 475/7, 18, 29, 30, 150, 151, 329; 251/129.03, 251/129.11, 248, 249.5
See application file for complete search history.

(56) References Cited

U.S. PATENT DOCUMENTS

| | | | | |
|---|---|---|---|---|
| 3,170,339 A | * | 2/1965 | Plume | 475/2 |
| 3,219,902 A | * | 11/1965 | Sibley | 318/475 |
| 4,261,224 A | * | 4/1981 | Sulzer | 475/2 |
| 4,896,562 A | * | 1/1990 | Wilkinson et al. | 475/3 |
| 4,994,001 A | * | 2/1991 | Wilkinson et al. | 475/4 |
| 5,090,658 A | * | 2/1992 | Kusmer | 251/14 |
| 6,129,337 A | * | 10/2000 | Wu | 251/248 |

\* cited by examiner

*Primary Examiner* — Justin Holmes
(74) *Attorney, Agent, or Firm* — Browdy and Neimark, PLLC

(57) ABSTRACT

An electrical drive apparatus for valves includes: a main body having an internal first receiving space in which a transmission unit is received; a drive unit disposed on one side of the main body for driving the transmission unit to rotate; a hand wheel fixed with a top section of the transmission unit, a lower section of the hand wheel being formed with several sockets; and a switch unit for controlling whether the hand wheel and the first transmission shaft can be rotated so as to switch the electrical drive apparatus between an electrical drive operation mode and a manual drive operation mode.

4 Claims, 24 Drawing Sheets

US 8,382,621 B2

ELECTRICAL DRIVE APPARATUS FOR VALVES

BACKGROUND OF THE INVENTION

1. Field of the Invention

The present invention relates generally to valves, and more particularly to an electrical drive apparatus for valves.

2. Description of the Related Art

In the field of valves, various electrically opened/closed valves controlled by electrical drive apparatuses have been developed instead of traditional manually operated valves for saving time and convenience. The electrical drive apparatuses serve to control opening/closing of the valves such as ball valves, butterfly valves or other types of valves.

However, when a valve body needs to be urgently closed in an emergency, while a blackout or a power cut unfortunately coincidentally takes place, it is still necessary to switch the valve body to a manual operation mode to manually operate/control the valve body.

For example, U.S. Pat. No. 4,994,001 discloses a structure for switching the valve body between an electrical drive mode and a manual drive mode.

However, the structure of U.S. Pat. No. 4,994,001 still has a shortcoming as follows: In case that a power cut or other special incident takes place and it is necessary to manually open or close the valve body, an operator needs to turn a hand wheel 16 to drive a worm 26 and a spiral gear 28. The spiral gear 28 then drives a transmission shaft 60 to control the valve body. Accordingly, it takes quite a lot of time for the operator to close or open the valve body. In general, there are numerous valve bodies in a working site. As a result, the operator is often exhausted after closing or opening all the valve bodies.

SUMMARY OF THE INVENTION

It is therefore a primary object of the present invention to provide an electrical drive apparatus for valves. When a blackout takes place, the electrical drive apparatus can be easily switched from an electrical drive mode to a manual drive mode by means of a switch unit. In the manual drive mode, the valve body can be manually opened or closed in much shorter time to gain more time effectiveness in an emergency.

BRIEF DESCRIPTION OF THE DRAWINGS

The detail structure, the applied principle, the function and the effectiveness of the present invention can be more fully understood with reference to the following description and accompanying drawings, in which.

DETAILED DESCRIPTION OF THE INVENTION

Figure 1:
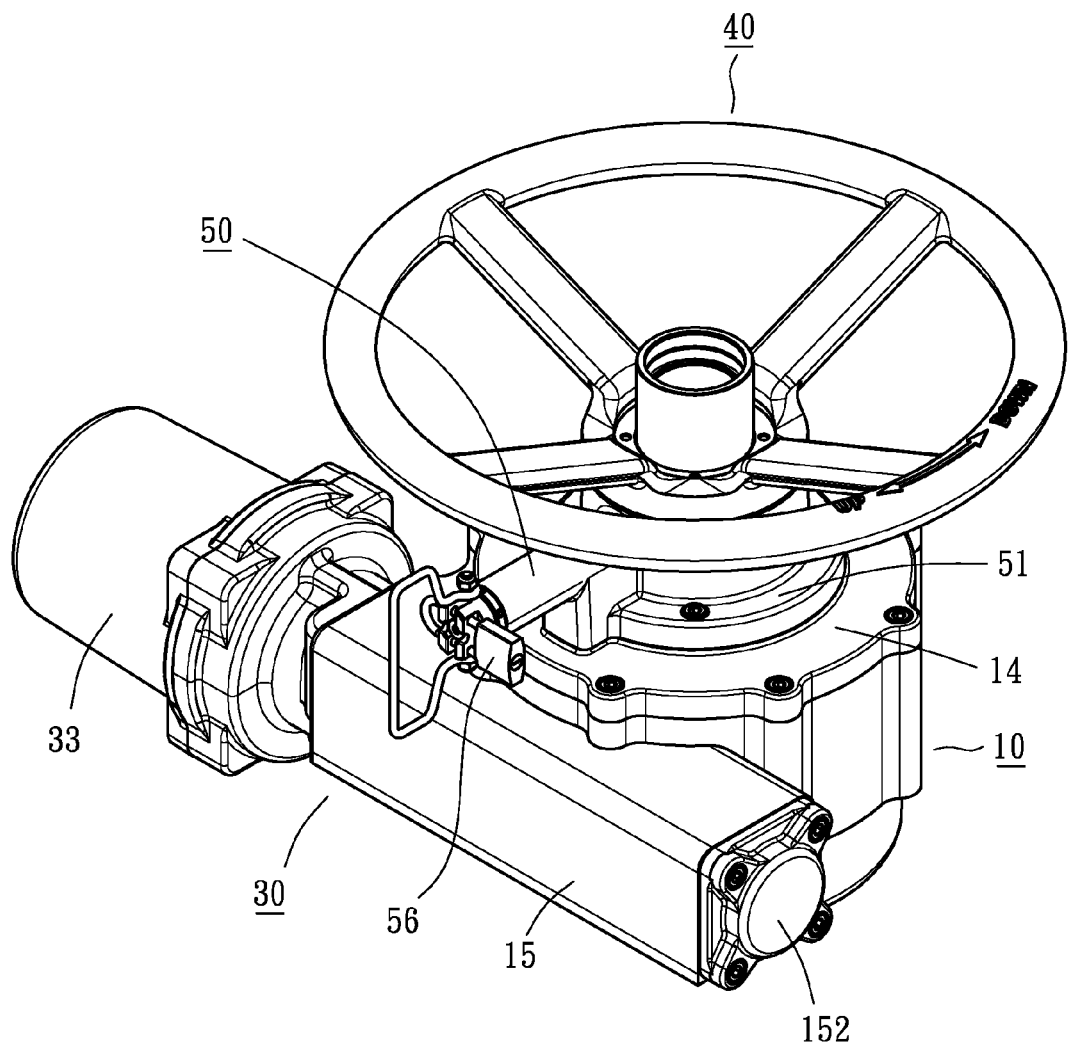
FIG. 1 is a perspective assembled view of a first embodiment of the present invention.
Figure 2:
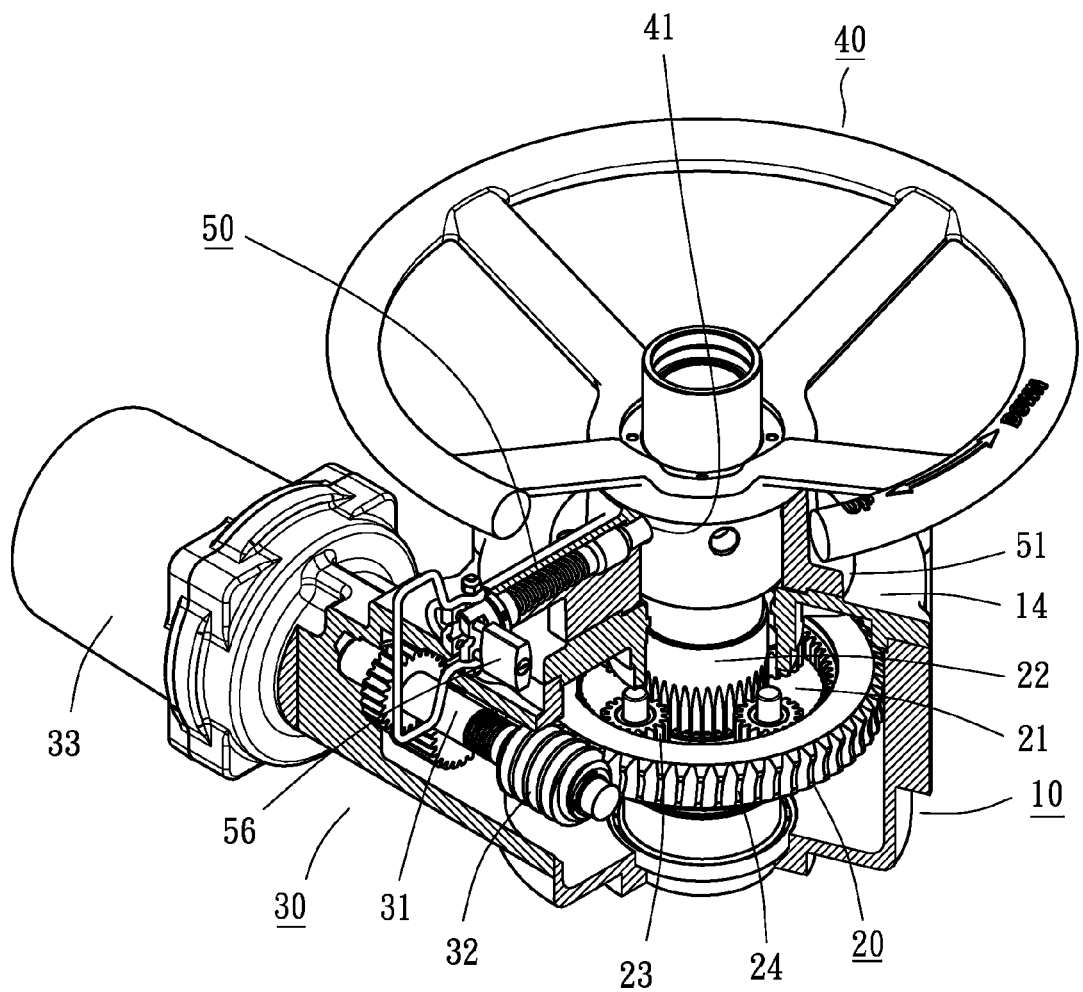
FIG. 2 is a partially sectional view according to FIG. 1.
Figure 3:
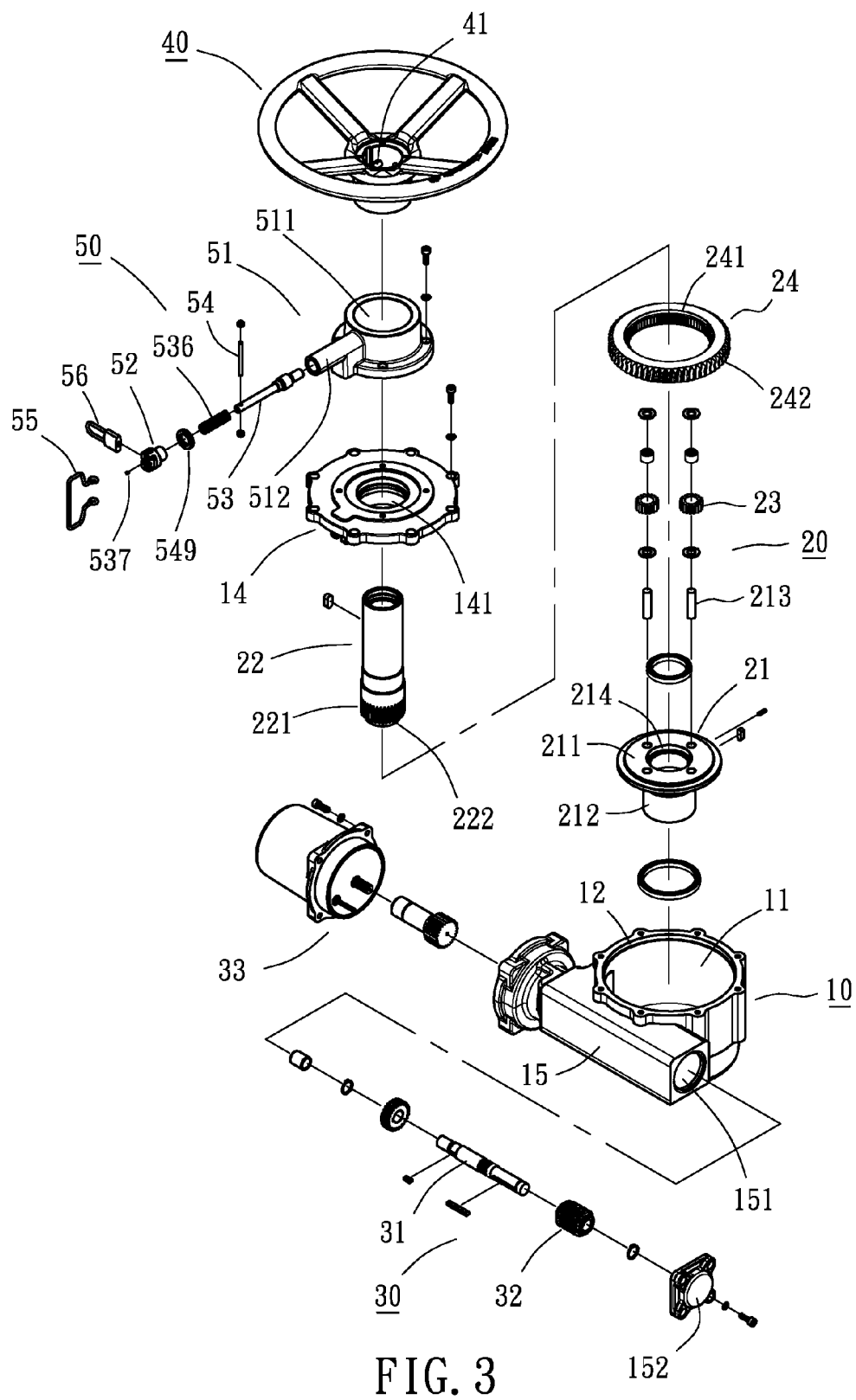
FIG. 3 is a perspective exploded view of the first embodiment of the present invention.
Figure 4:
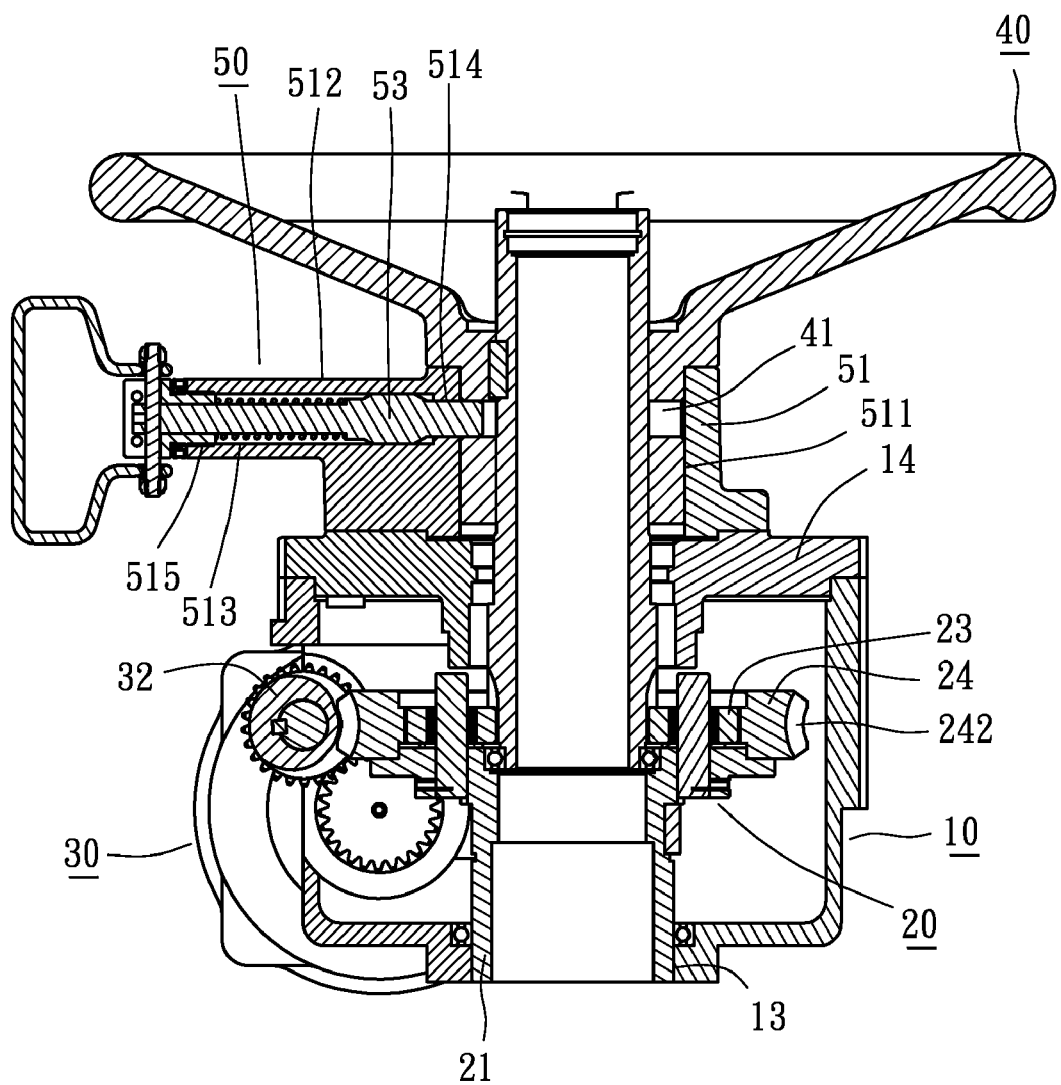
FIG. 4 is a sectional view according to FIG. 1.
Figure 5:
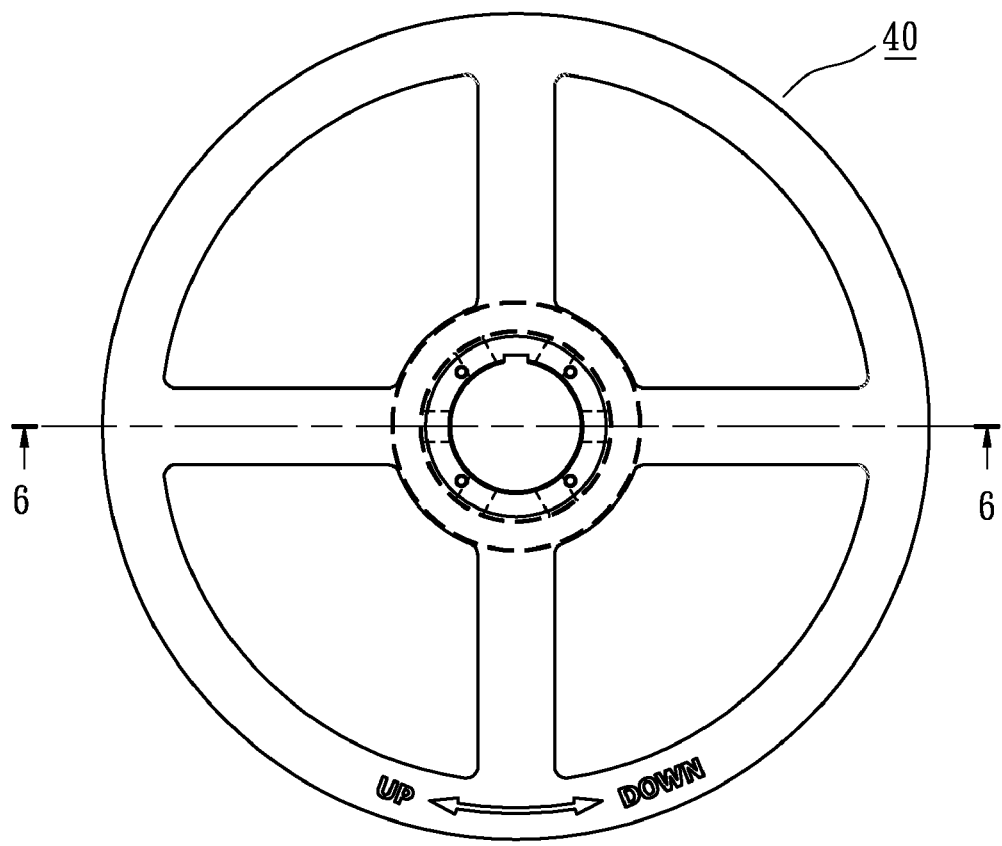
FIG. 5 is a top view of the hand wheel 40 of the present invention.
Figure 6:
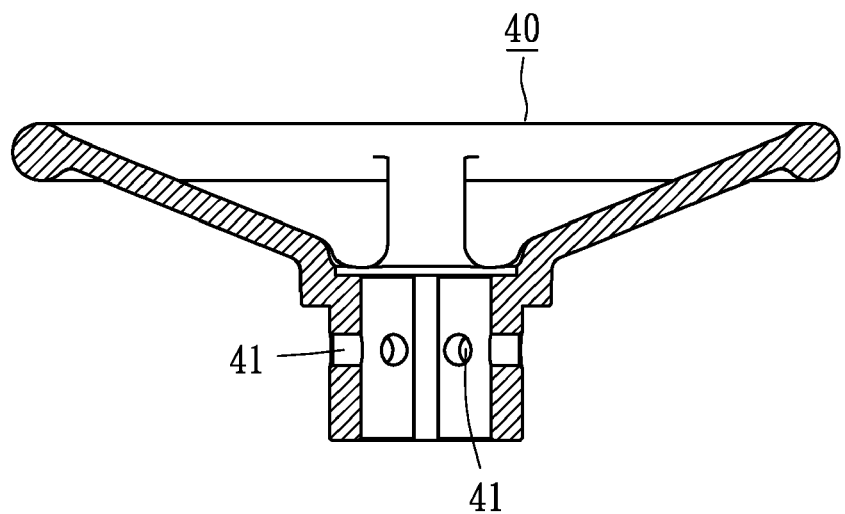
FIG. 6 is a sectional view taken along line 6-6 of FIG. 5.
Figure 7:
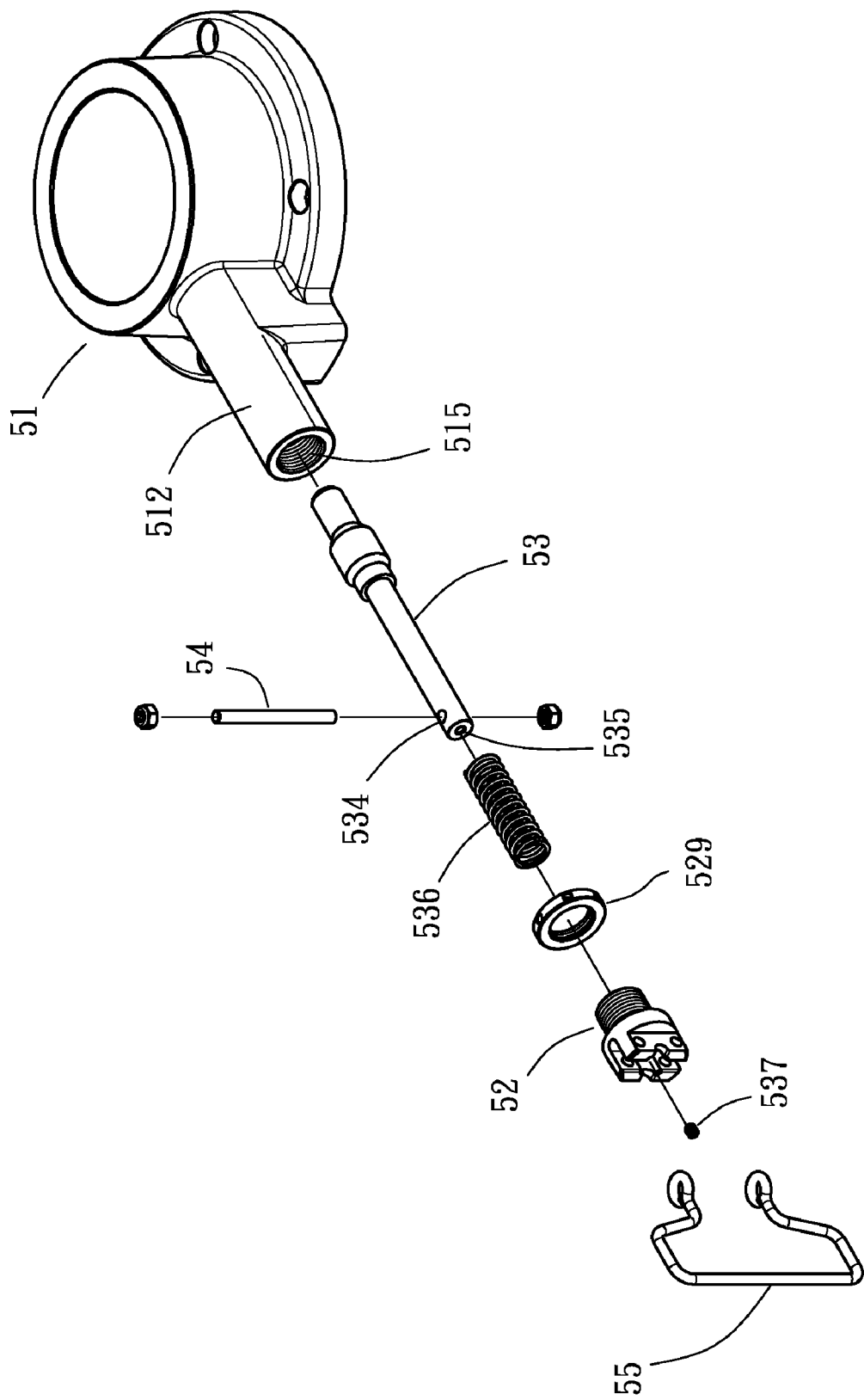
FIG. 7 is a perspective exploded view of the switch unit 50 of the present invention.
Figure 8:
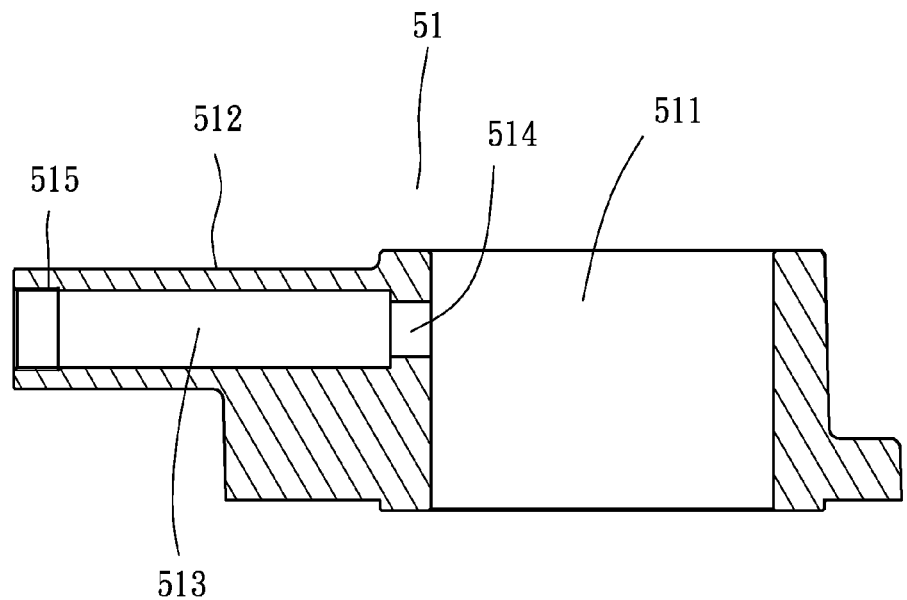
FIG. 8 is a sectional view of the base seat 51 of the present invention.
Figure 9:
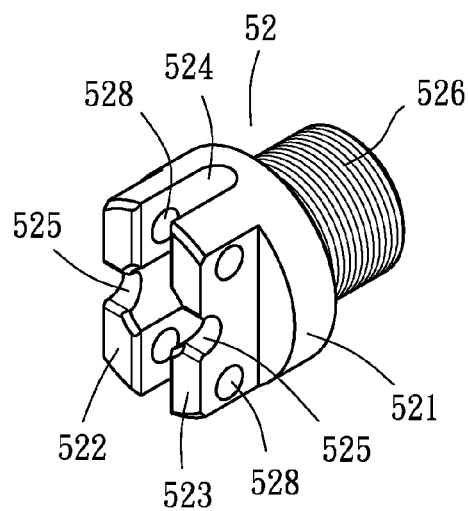
FIGS. 9 and 10 are a perspective view and a sectional view of the restriction seat 52 of the present invention.
Figure 10:
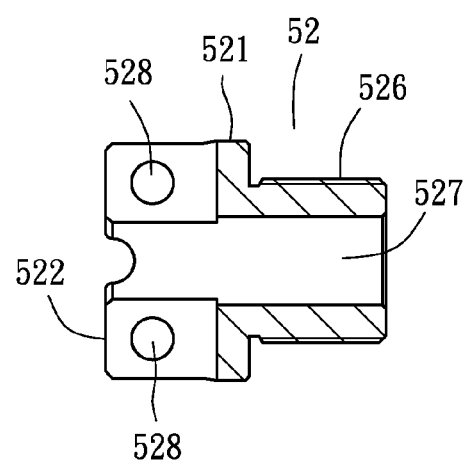
Figure 11:
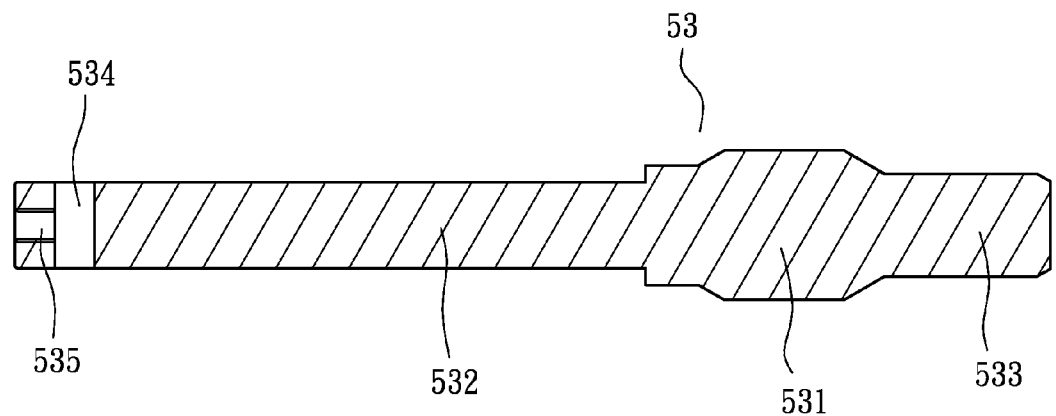
FIG. 11 is a sectional view of the clutch pull rod 53 of the present invention.
Figure 12:
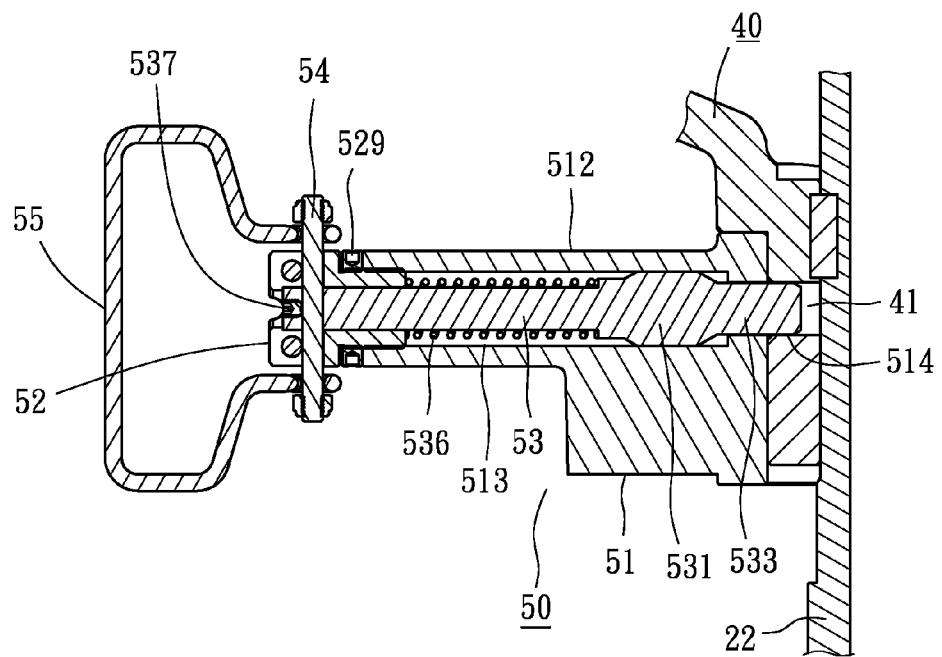
FIG. 12 is a sectional assembled view of the switch unit 50 of the present invention.

Please refer to FIGS. 1 to 12, which show a first embodiment of the present invention. According to the first embodiment, the present invention includes a main body 10 having an internal first receiving space 11. A first opening 12 is formed at a top section of the first receiving space 11, while a second opening 13 is formed at a bottom section of the first receiving space 11. The first opening 12 is sealed with a first cover body 14 formed with a central through hole 141. A chamber 15 is disposed on one side of the main body 10. The chamber 15 has an internal second receiving space 151 sealed with a second cover body 152.

The present invention further includes a transmission unit 20 including a bracket 21, a first transmission shaft 22, several planetary gears 23 and a gear ring 24. The bracket 21 has a tray section 211 and a hub section 212 downward extending from a bottom face of the tray section 211. A lower section of the hub section 212 is rotatably disposed in the second opening 13 of the main body 10. Several pin members 213 are arranged on a top face of the tray section 211 in predetermined positions at intervals. A center of the top face of the tray section 211 is formed with a support section 214. An outer gear section 221 is formed on an outer circumference of a bottom section of the first transmission shaft 22. A locating section 222 downward axially extends from the outer gear section 221. The locating section 222 is rotatably located in the support section 214 of the tray section 211. An upper section of the first transmission shaft 22 extends through the through hole 141 of the first cover body 14 to an upper side thereof. The planetary gears 23 are respectively rotatably fitted on the pin members 213 and annularly engaged with the outer gear section 221 of the first transmission shaft 22. The gear ring 24 has an inner gear section 241 on inner circumference and a spiral gear section 242 on outer circumference. The planetary gears 23 are engaged with the inner gear section 241 of the gear ring 24.

The present invention further includes a drive unit 30 mainly including a shaft member 31, a worm 32 and an electrical drive assembly 33. The shaft member 31 is installed in the chamber 15. The worm 32 is fixedly mounted on a rear section of the shaft member 31 and engaged with the spiral gear section 242 of the gear ring 24. The electrical drive assembly 33 serves to drive and rotate the shaft member 31.

The present invention further includes a hand wheel 40 fixed with a top section of the first transmission shaft 22. A lower section of the hand wheel 40 is formed with several sockets 41.

The present invention further includes a switch unit 50 for controlling whether the hand wheel 40 and the first transmission shaft 22 can be rotated so as to switch the present invention between an electrical drive operation mode and a manual drive operation mode. The switch unit 50 includes a base seat 51, a restriction seat 52, a clutch pull rod 53, a pull pin 54, a pull ring 55 and a lock device 56. The base seat 51 is fixedly disposed on a top section of the first cover body 14 and formed with a central hole 511. The lower section of the hand wheel 40 is rotatably disposed in the central hole 511. The base seat 51 has a sleeve section 512 outward extending from an outer circumference of the base seat 51 corresponding to the sockets 41 of the hand wheel 40. The sleeve section 512 is formed with a large-diameter hole 513 inward extending from an outer end face of the sleeve section 512 by a predetermined depth. An inner wall of the large-diameter hole 513 is further formed with an inward extending small-diameter hole 514 in communication with the central hole 511 corresponding to the sockets 41 of the hand wheel 40. An inner threaded section 515 is formed on an outer section of the large-diameter hole 513. The restriction seat 52 has a tray section 521. A first block section 522 and a second block section 523 are symmetrically disposed on a left end face of the tray section 521 in parallel to each other. The first and second block sections 522, 523 define therebetween a first notch 524. Two second notches 525 are respectively symmetrically formed on middle sections of left end faces of the first and second block sections 522, 523. A threaded hub section 526 axially extends from a right end face of the tray section 521. The threaded hub section 526 is formed with a passage 527 axially leftward extending from a right end face of the threaded hub section 526 in communication with the first notch 524. The first and second block bodies 522, 523 are further formed with symmetrical lock holes 528. A nut 529 is screwed on a left section of the threaded hub section 526. Then the threaded hub section 526 is screwed into the inner threaded section 515. The clutch pull rod 53 has a large-diameter section 531, a first small-diameter section 532 axially extending from a left side of the large-diameter section 531 and a second small-diameter section 533 axially extending from a right side of the large-diameter section 531. A left section of the first small-diameter section 532 is formed with a vertically extending through hole 534. A small threaded hole 535 is formed on a left end face of the first small-diameter section 532. The small threaded hole 535 rightward axially extends to communicate with the through hole 534. A compression spring 536 is fitted around the first small-diameter section 532 of the clutch pull rod 53. The clutch pull rod 53 is installed in the large-diameter hole 513 of the base seat 51. A left end of the compression spring 536 abuts against the right end face of the restriction seat 52, while a right end of the compression spring 536 abuts against a left end face of the large-diameter section 531. Via the resilient force of the compression spring 536, the second small-diameter section 533 of the clutch pull rod 53 passes through the small-diameter hole 514 of the base seat 51 to plug into one of the sockets 41 of the hand wheel 40. The pull pin 54 is positioned in the first notch 524 of the restriction seat 52. The pull pin 54 is inserted through the through hole 534 of the clutch pull rod 53. A screw 537 is screwed into the small threaded hole 535 of the clutch pull rod 53 to fix the pull pin 54. The pull ring 55 has two free ends, which are respectively fixed with a top end and a bottom end of the pull pin 54. The lock device 56 is passed through the lock holes 528 and locked with the restriction seat 52 and positioned on a left side of the pull pin 54.

Figure 13:
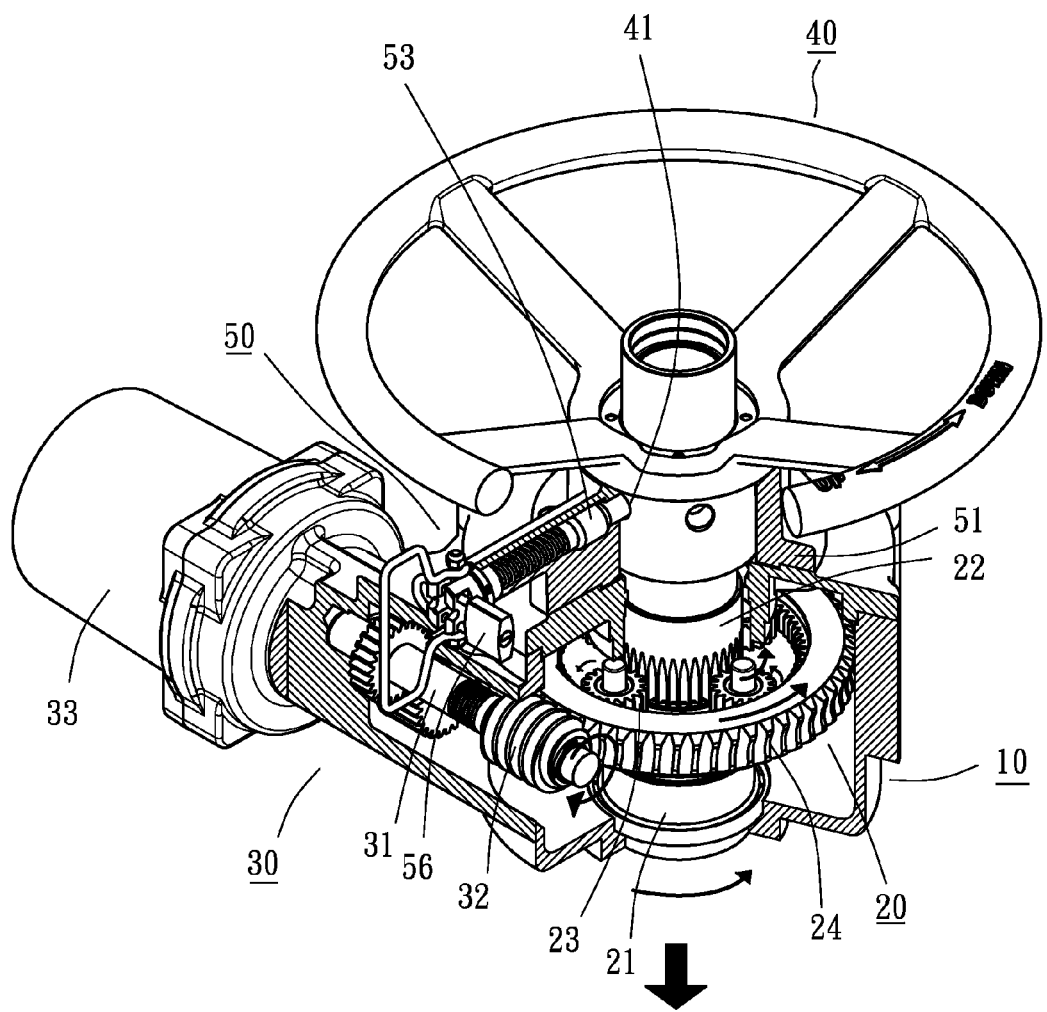
FIGS. 13 and 14 show the transmission operation of the present invention in the electrical drive mode.
Figure 14:
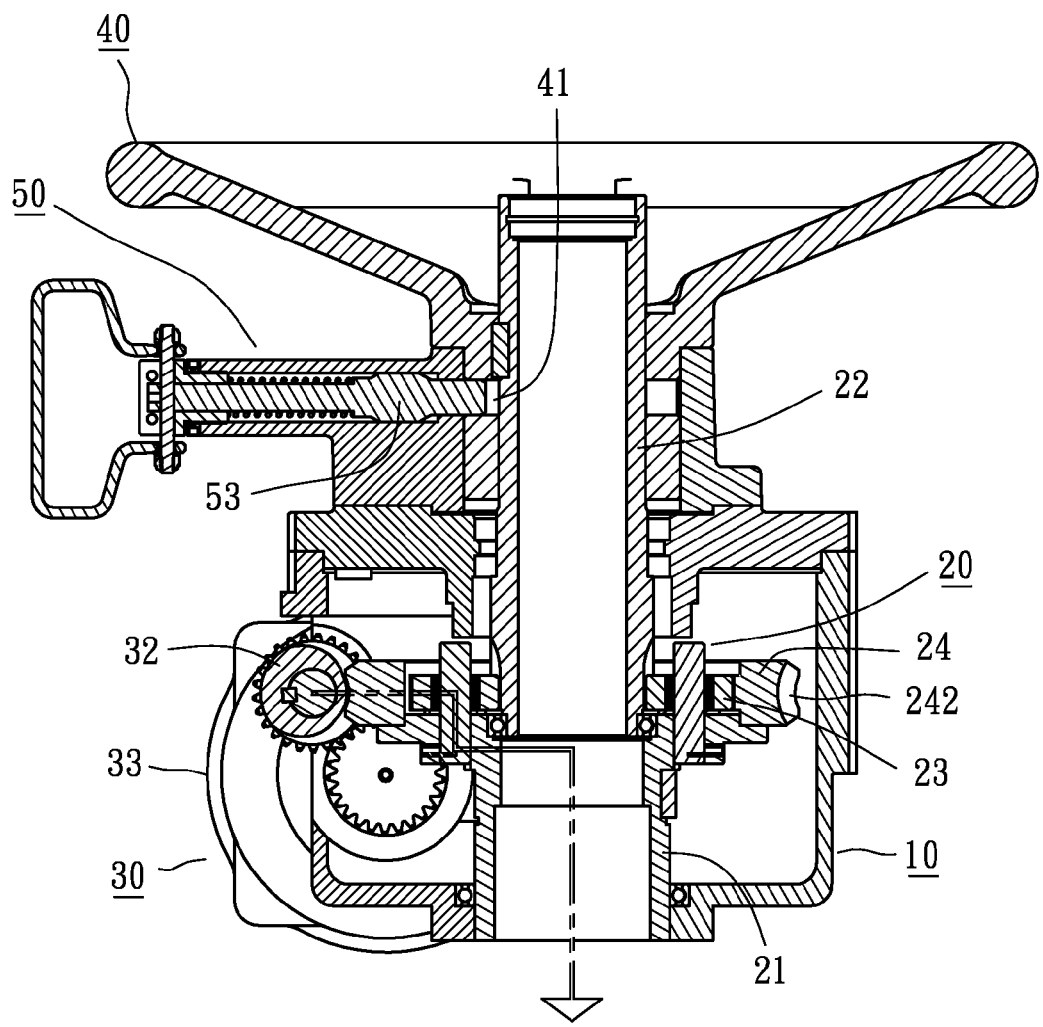

FIGS. 13 and 14 show the transmission operation of the present invention in the electrical drive mode. In this operation mode, the hand wheel 40 is engaged with and restricted by the clutch pull rod 53 of the switch unit 50 so that the hand wheel 40 and the first transmission shaft 22 are fixed and unmovable. In this case, the electrical drive assembly 33 drives and rotates the shaft member 31. Via the worm 32, the gear ring 24 is driven to rotate the planetary gears 23. Simultaneously, the bracket 21 is driven and rotated to control opening/closing of a valve body connected under the bracket 21.

Figure 15:
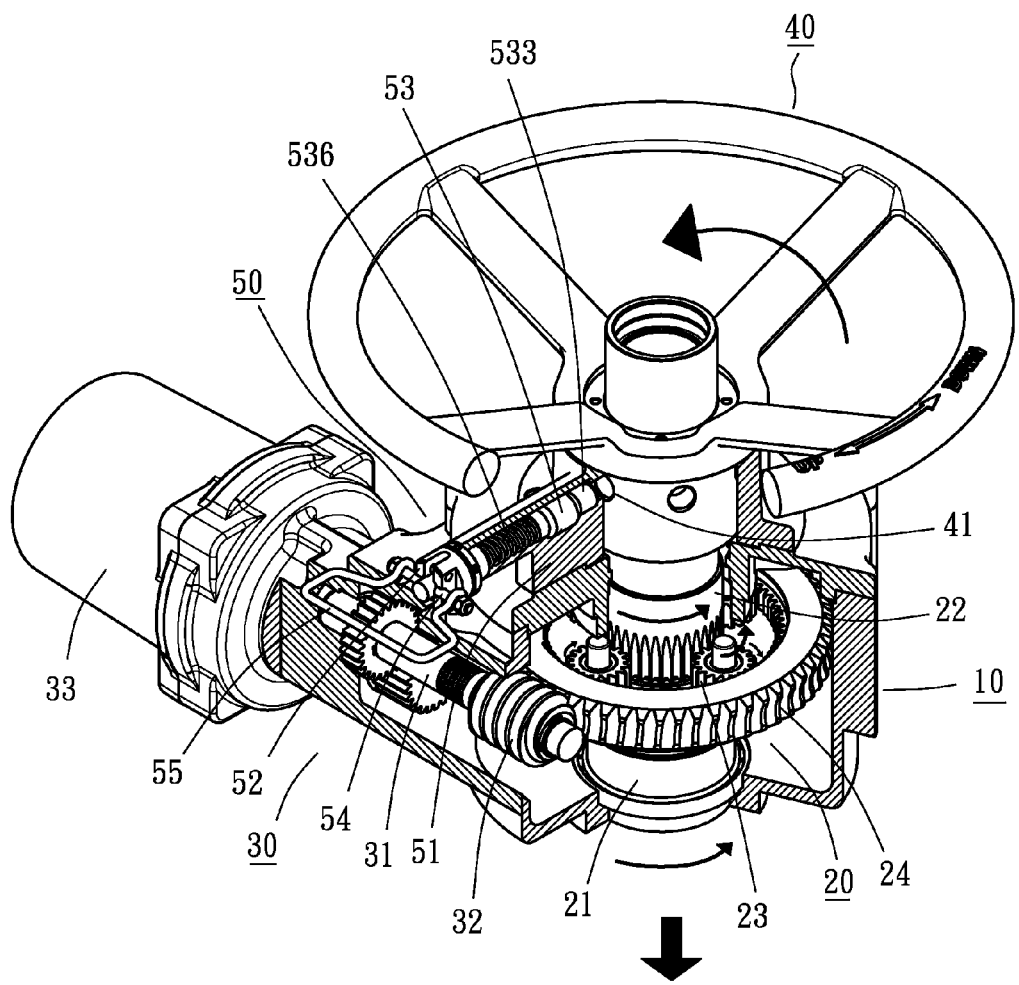
FIGS. 15 to 17 show the transmission operation of the present invention in the manual drive mode.
Figure 16:
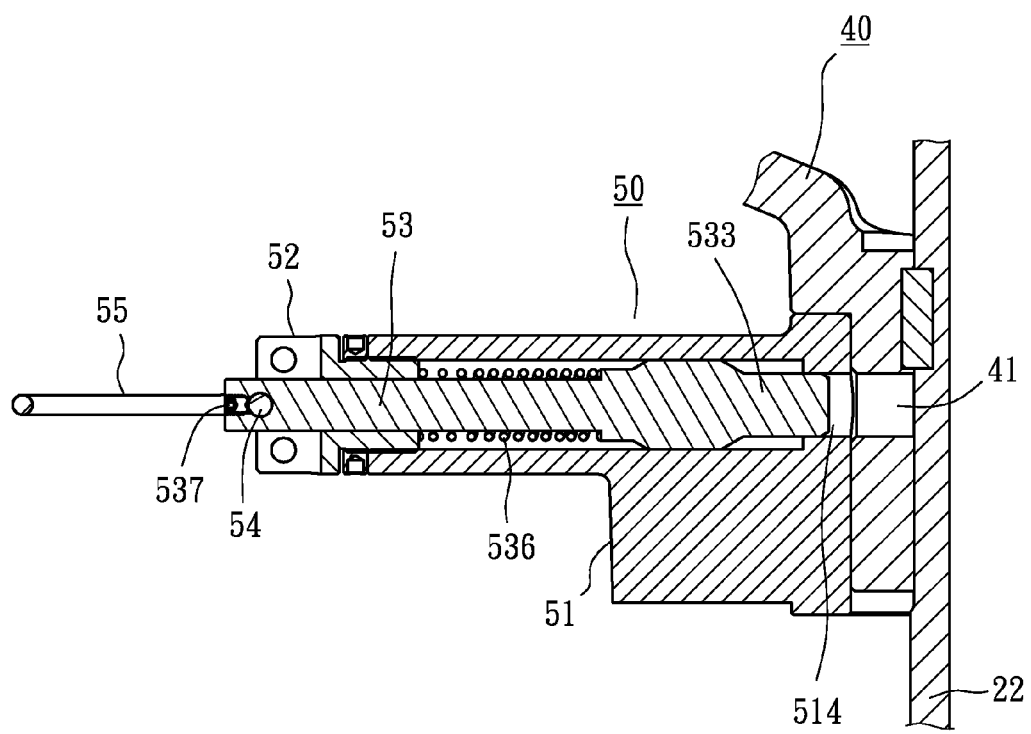
Figure 17:
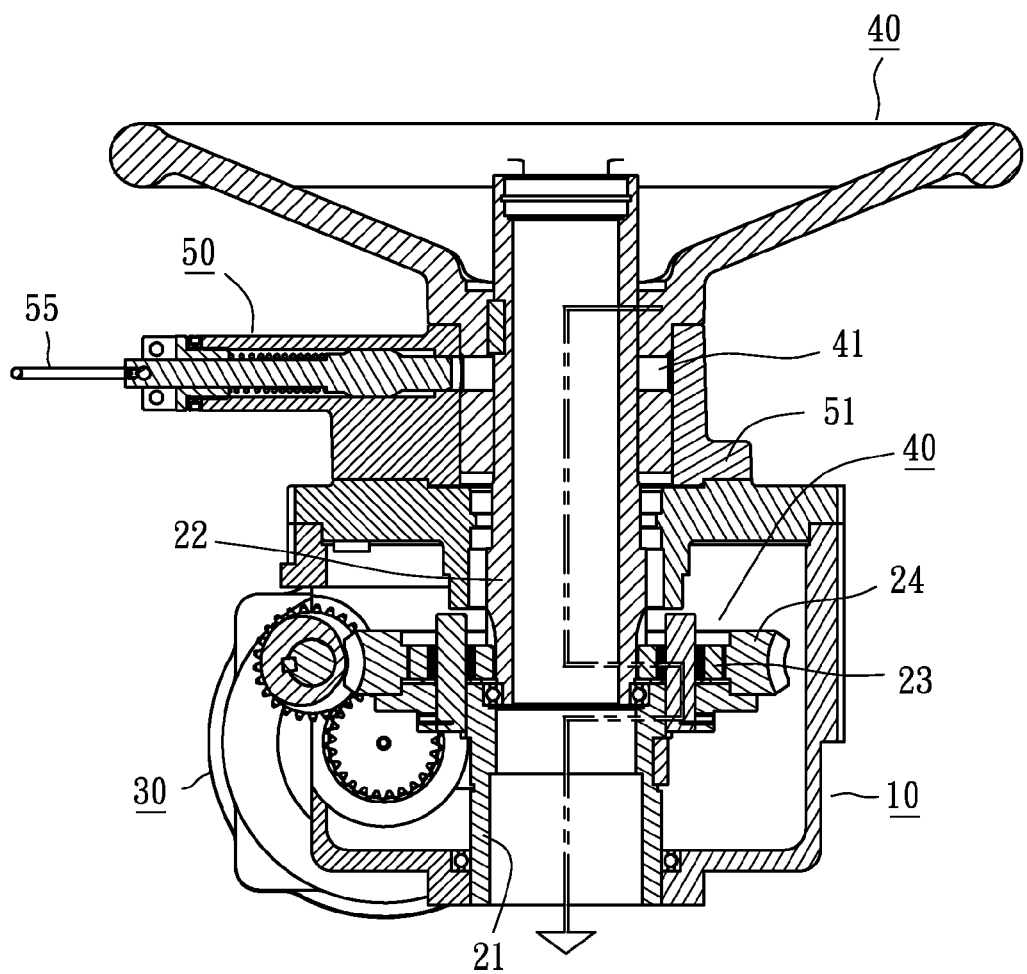
Figure 18:
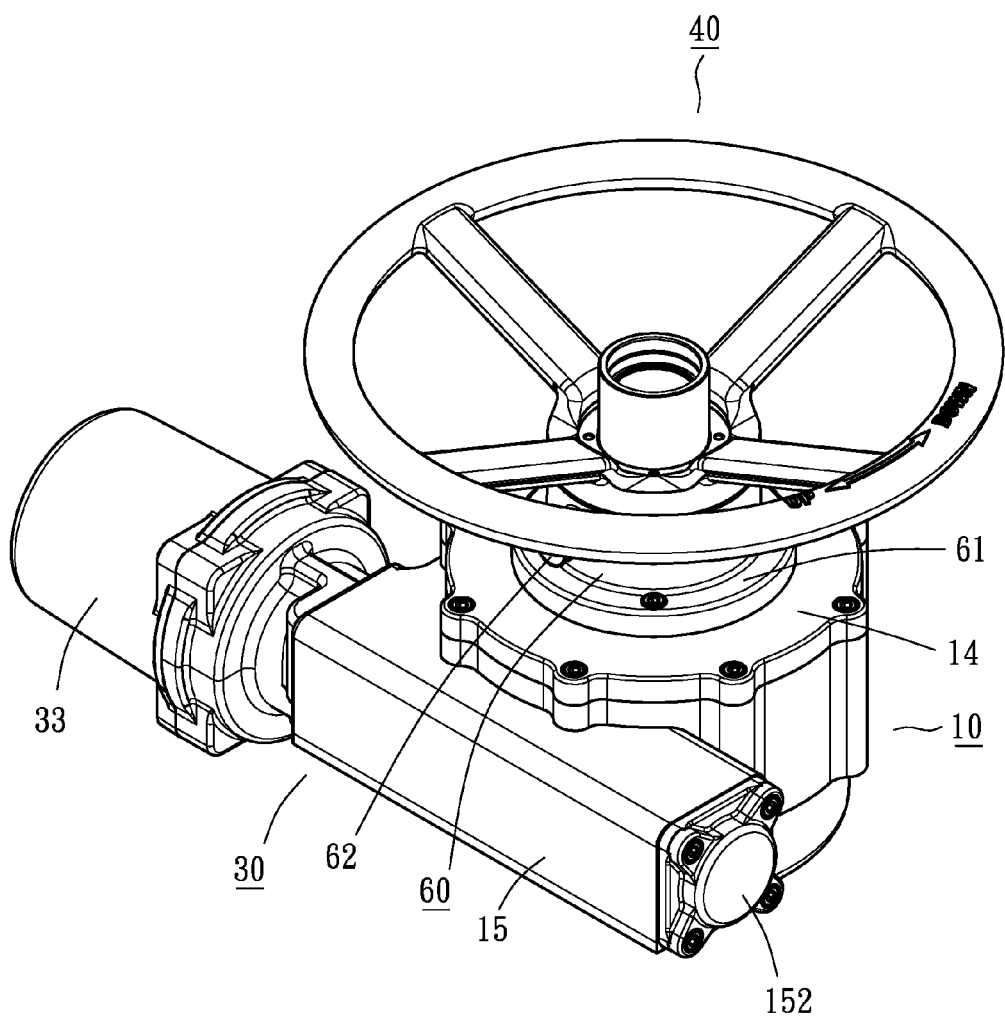
FIG. 18 is a perspective assembled view of a second embodiment of the present invention.
Figure 19:
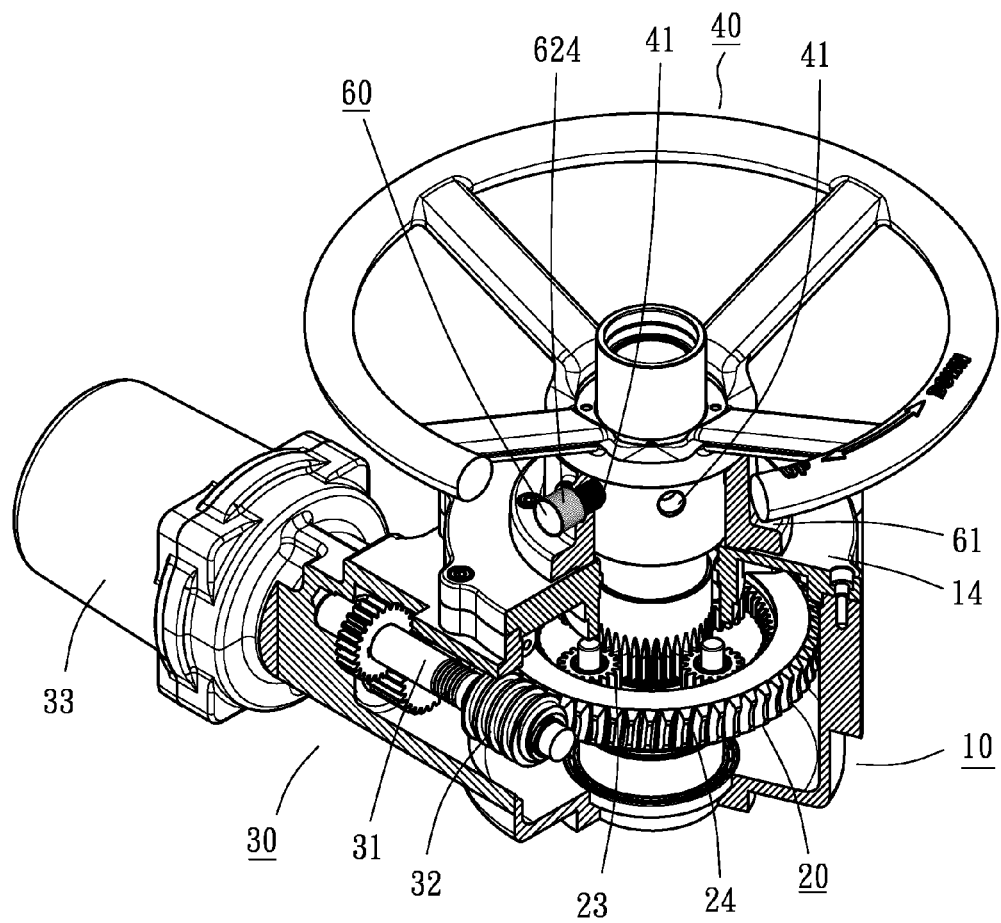
FIG. 19 is a partially sectional view according to FIG. 18.
Figure 20:
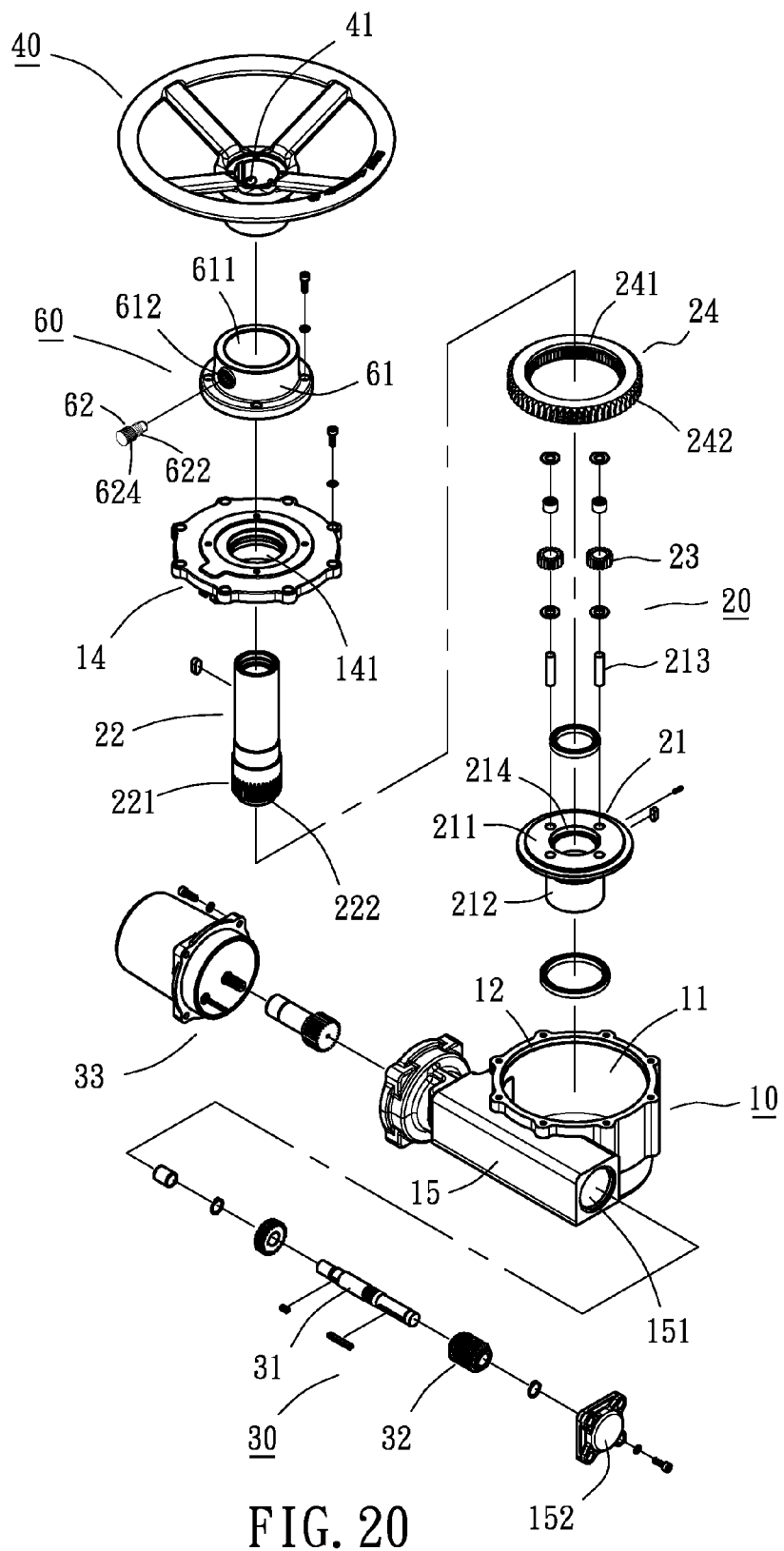
FIG. 20 is a perspective exploded view of the second embodiment of the present invention.
Figure 21:
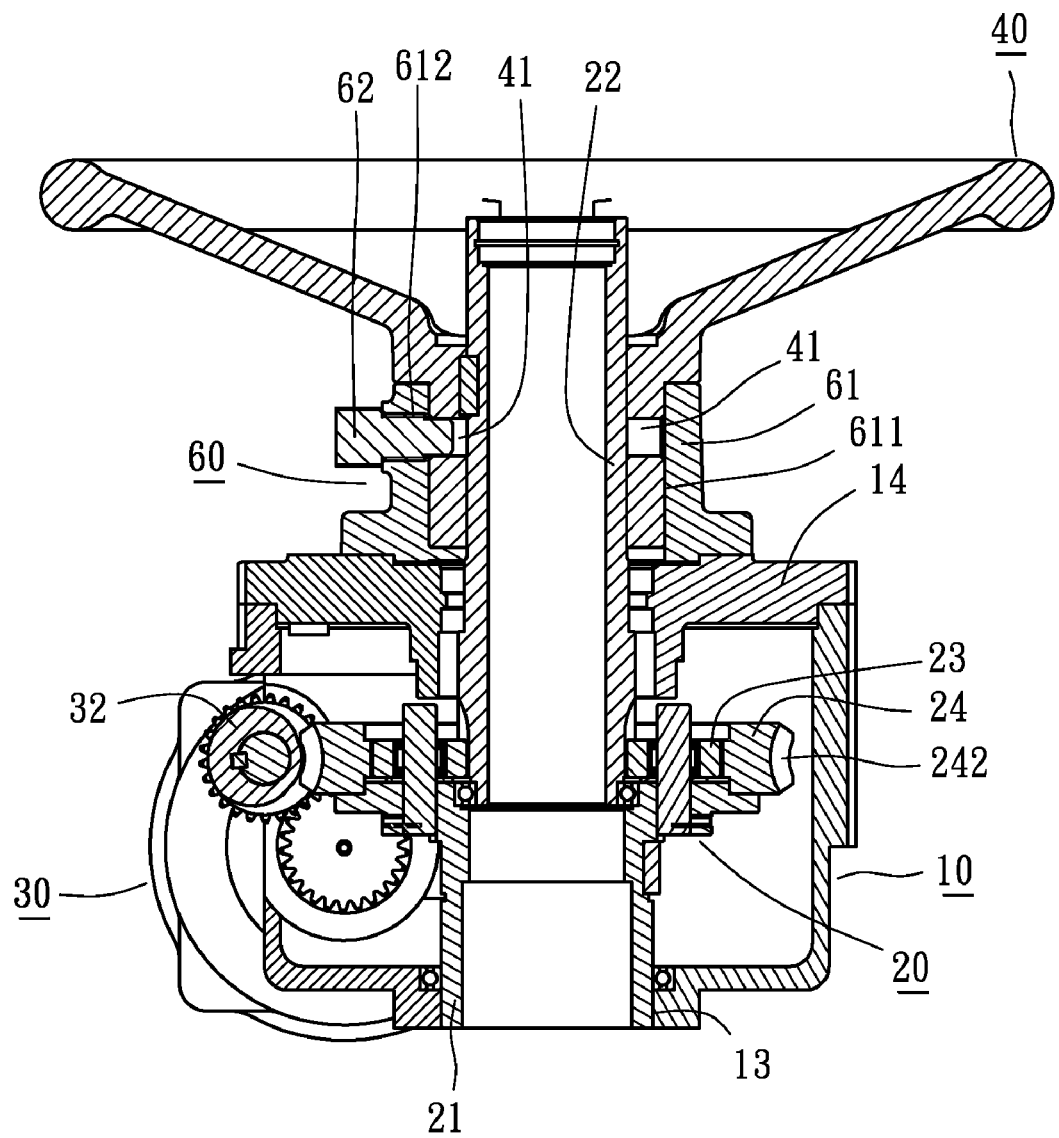
FIG. 21 is a sectional view according to FIG. 18.
Figure 22:
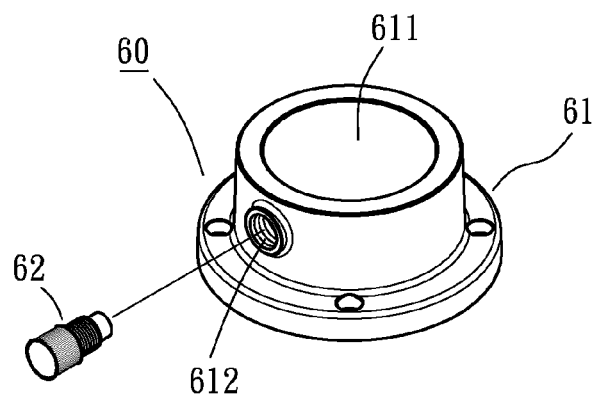
FIG. 22 is a perspective exploded view of the switch unit 60 of the present invention.
Figure 23:
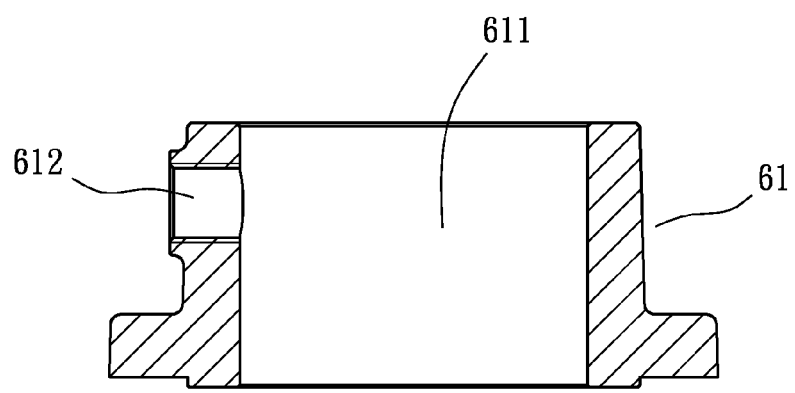
FIG. 23 is a sectional view of the base seat 61 of the present invention.
Figure 24:
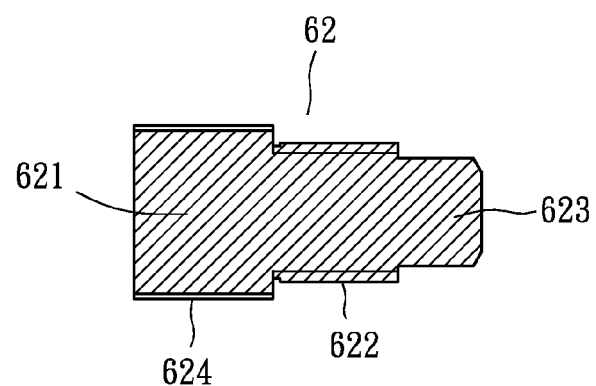
FIG. 24 is a sectional view of the switch rod 62 of the present invention.
Figure 25:
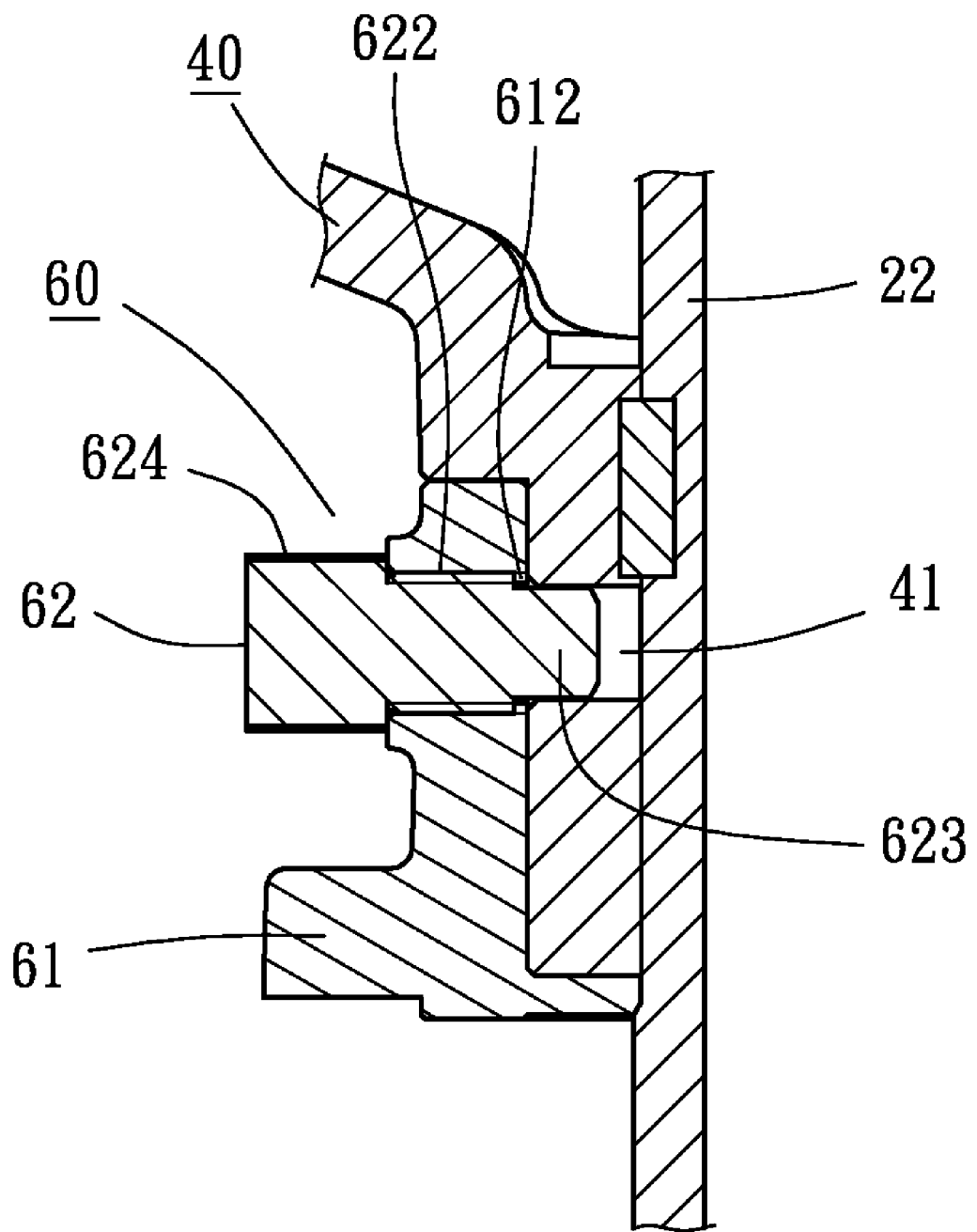
FIG. 25 is a sectional assembled view of the switch unit 60 of the present invention.

FIGS. 15 to 17 show the transmission operation of the present invention in the manual drive mode. In case that a blackout or failure of electrical system takes place and thus the electrical drive assembly 33 cannot operate, the present invention must be switched from the electrical drive mode to the manual drive mode to manually operate the valve body. In the manual drive mode, the gear ring 24 is fixed and unmovable. Under such circumstance, a user first takes off the lock device 56 and then forcedly pulls the pull ring 55 leftward. At this time, the compression spring 536 is forcedly deformed and the clutch pull rod 53 is moved leftward, whereby the second small-diameter section 533 of the clutch pull rod 53 is disengaged from the socket 41 of the hand wheel 40. Then the pull ring 55 is 90-degree rotated to engage the pull pin 54 in the second notches 525 of the restriction seat 52. Under such circumstance, the user can turn the hand wheel 40 to rotate the first transmission shaft 22. Simultaneously, the planetary gears 23 and the bracket 21 are driven and rotated to control opening/closing of the valve body connected under the bracket 21.

When restored to the electrical drive mode, the pull ring 55 is forcedly pulled leftward and 90-degree turned to restore the pull ring 54 into the first notch 524 of the restriction seat 52. Then the lock device 56 is relocked with the restriction seat 52 to avoid mis-operation.

According to the above arrangement, when a blackout takes place, the present invention can be easily switched from the electrical drive mode into the manual drive mode by means of the switch unit. In the manual drive mode, the valve body can be manually opened or closed in much shorter time to save time and strength. Therefore, in case of an emergency, the valve body can be more quickly opened or closed to gain more time effectiveness.

FIGS. 18 to 25 show a second embodiment of the present invention. The second embodiment is different from the first embodiment in that the switch unit 60 includes a base seat 61 and a switch rod 62. The base seat 61 is fixedly disposed on the top section of the first cover body 14 and formed with a central hole 611. The lower section of the hand wheel 40 is rotatably disposed in the central hole 611. The base seat 61 is formed with a threaded hole 612 corresponding to the sockets 41 of the hand wheel 40. The switch rod 62 has a head section 621, a threaded section 622 rightward axially extending from the head section 621 and an engagement section 623 rightward axially extending from the threaded section 622. An outer circumference of the head section 621 is formed with an embossed section 624. The threaded section 622 is screwed in the threaded hole 612 of the base seat 61. The engagement section 623 is inserted into one of the sockets 41 of the hand wheel 40.

Figure 26:
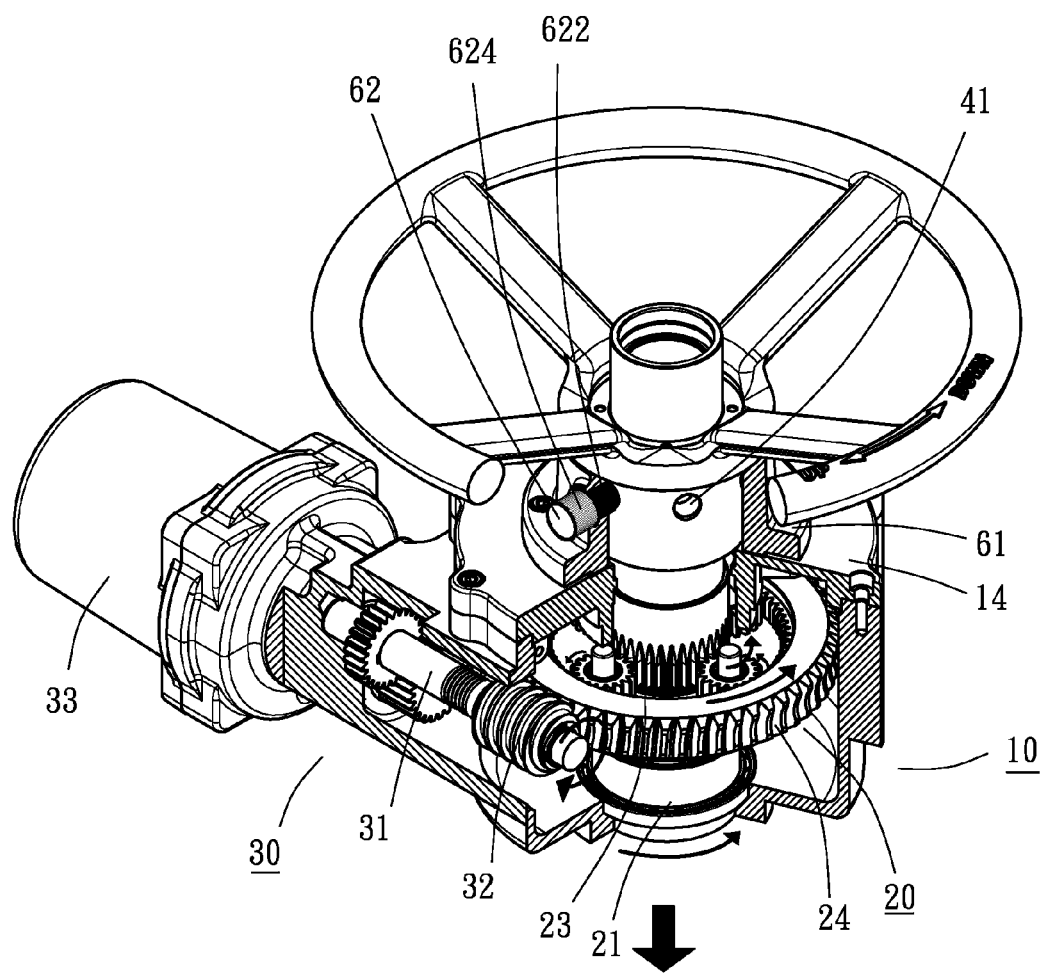
FIGS. 26 and 27 show the transmission operation of the present invention in the electrical drive mode.
Figure 27:
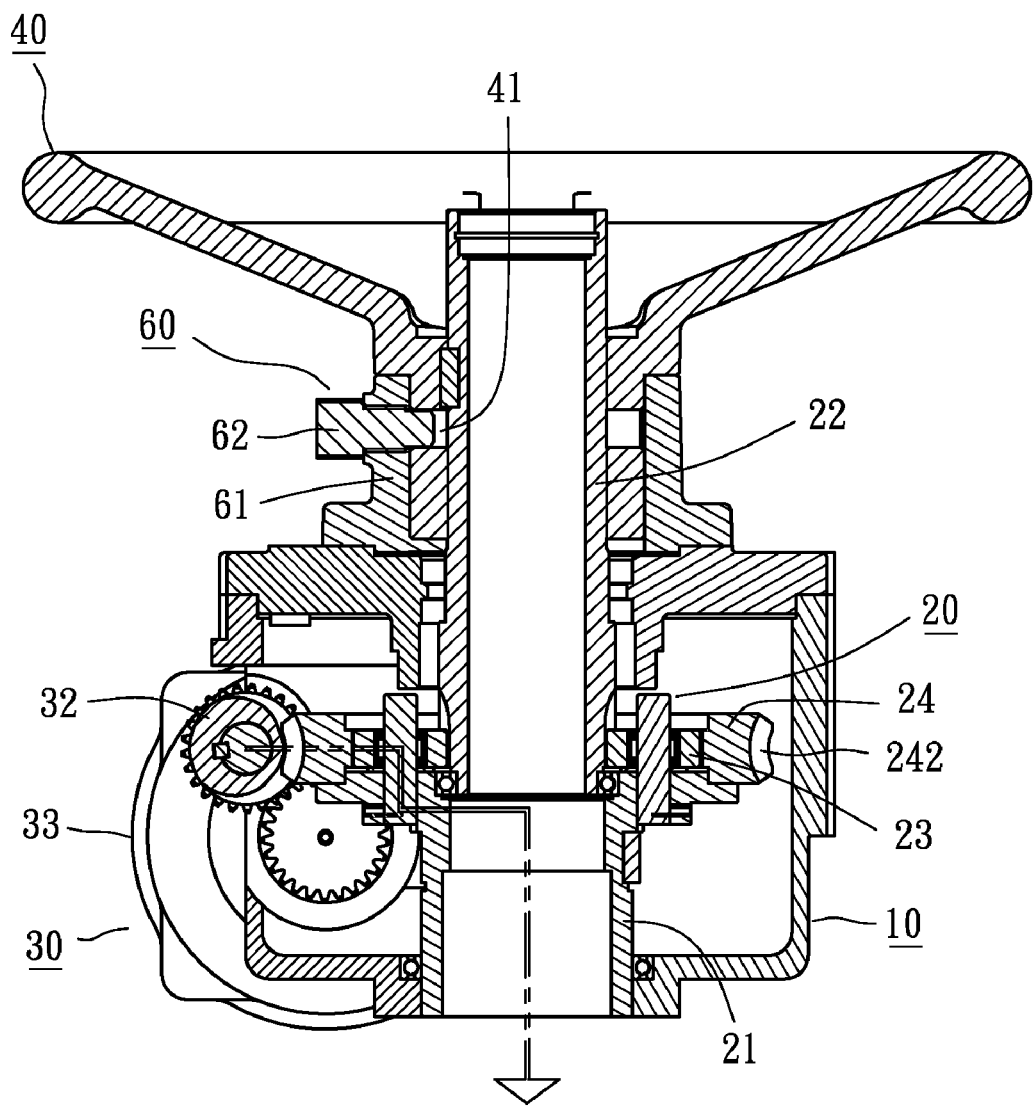

FIGS. 26 and 27 show the transmission operation of the second embodiment of the present invention in the electrical drive mode. In this operation mode, the hand wheel 40 is engaged with and restricted by the switch rod 62 of the switch unit 50 so that the hand wheel 40 and the first transmission shaft 22 are fixed and unmovable. In this case, the electrical drive assembly 33 drives and rotates the shaft member 31. Via the worm 32, the gear ring 24 is driven to rotate the planetary gears 23. Simultaneously, the bracket 21 is driven and rotated to control opening/closing of a valve body connected under the bracket 21.

Figure 28:
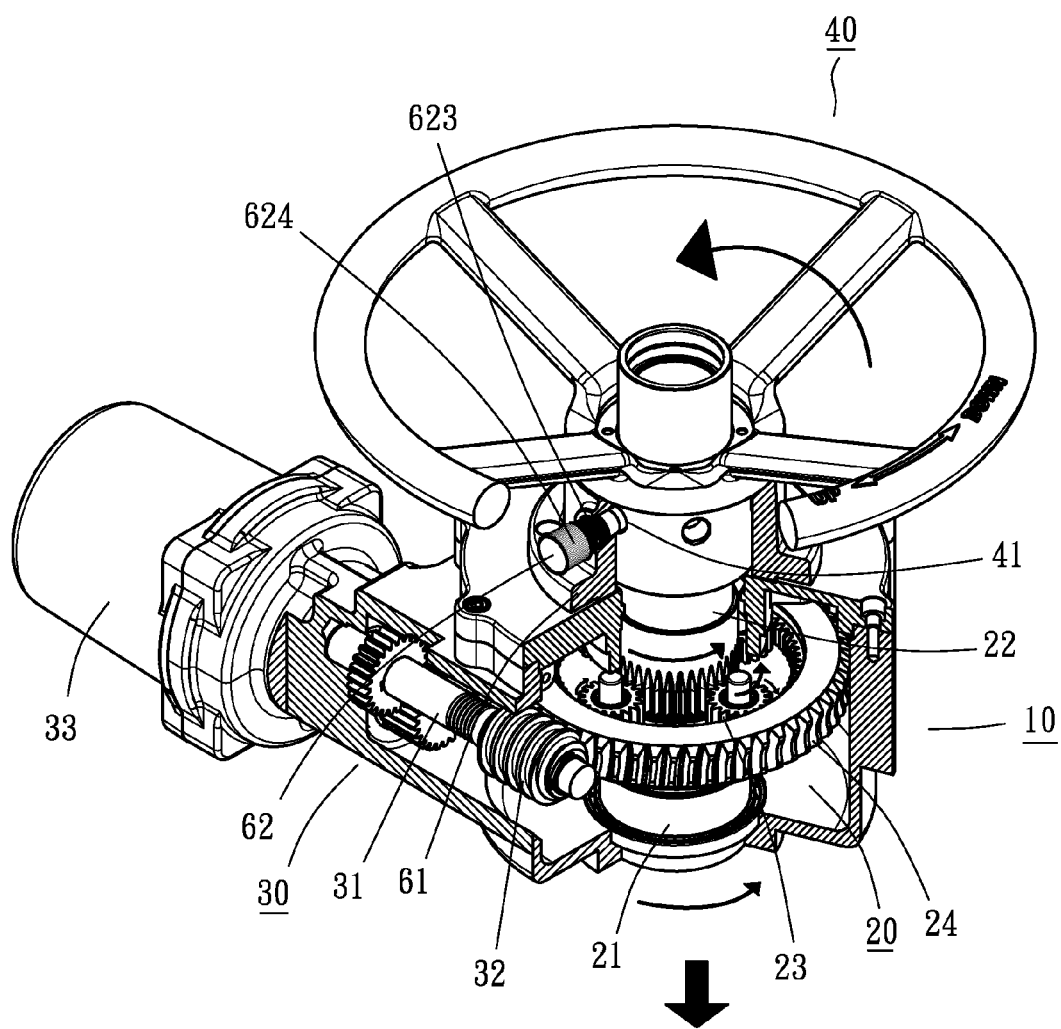
FIGS. 28 to 30 show the transmission operation of the present invention in the manual drive mode.
Figure 29:
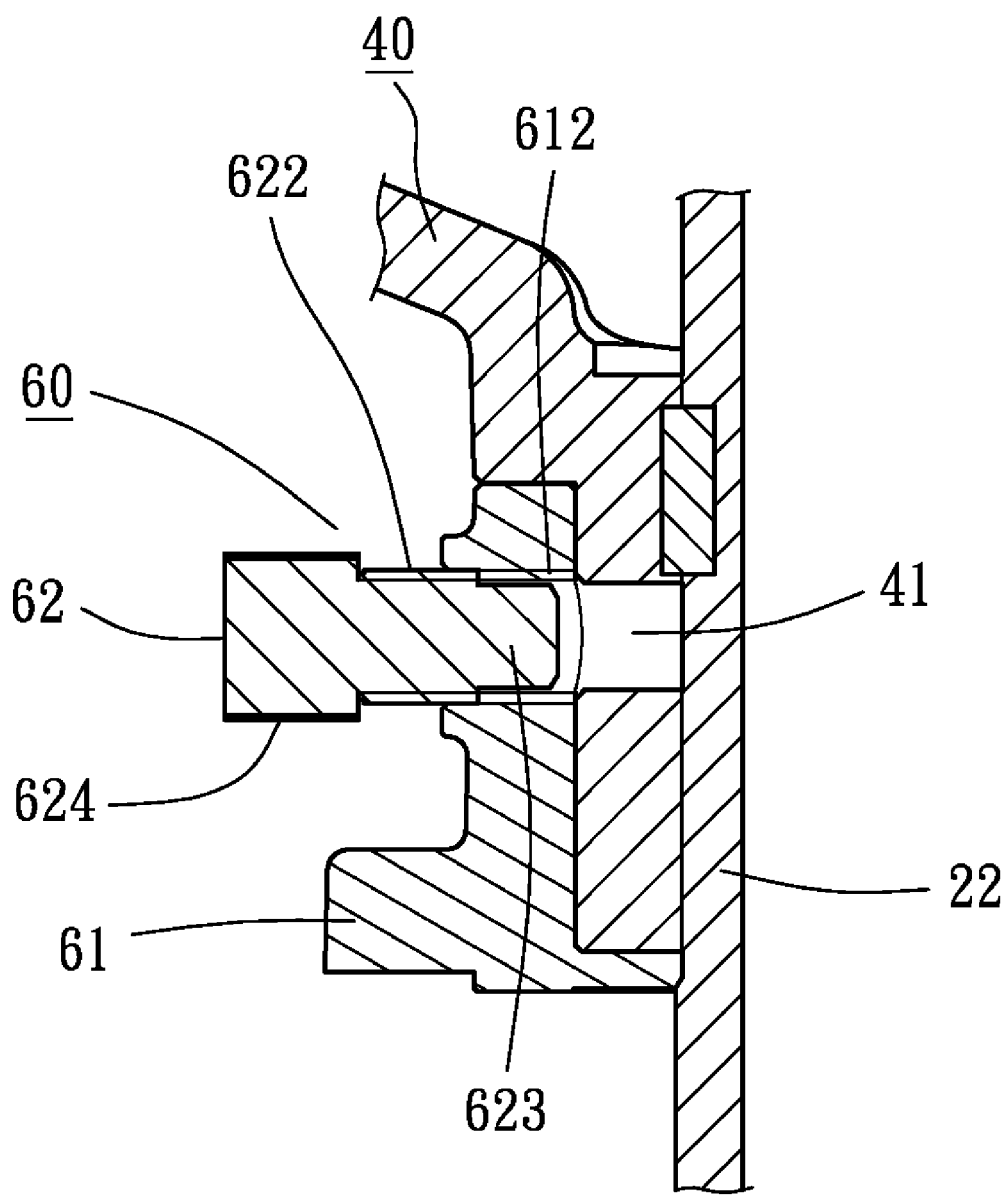
Figure 30:
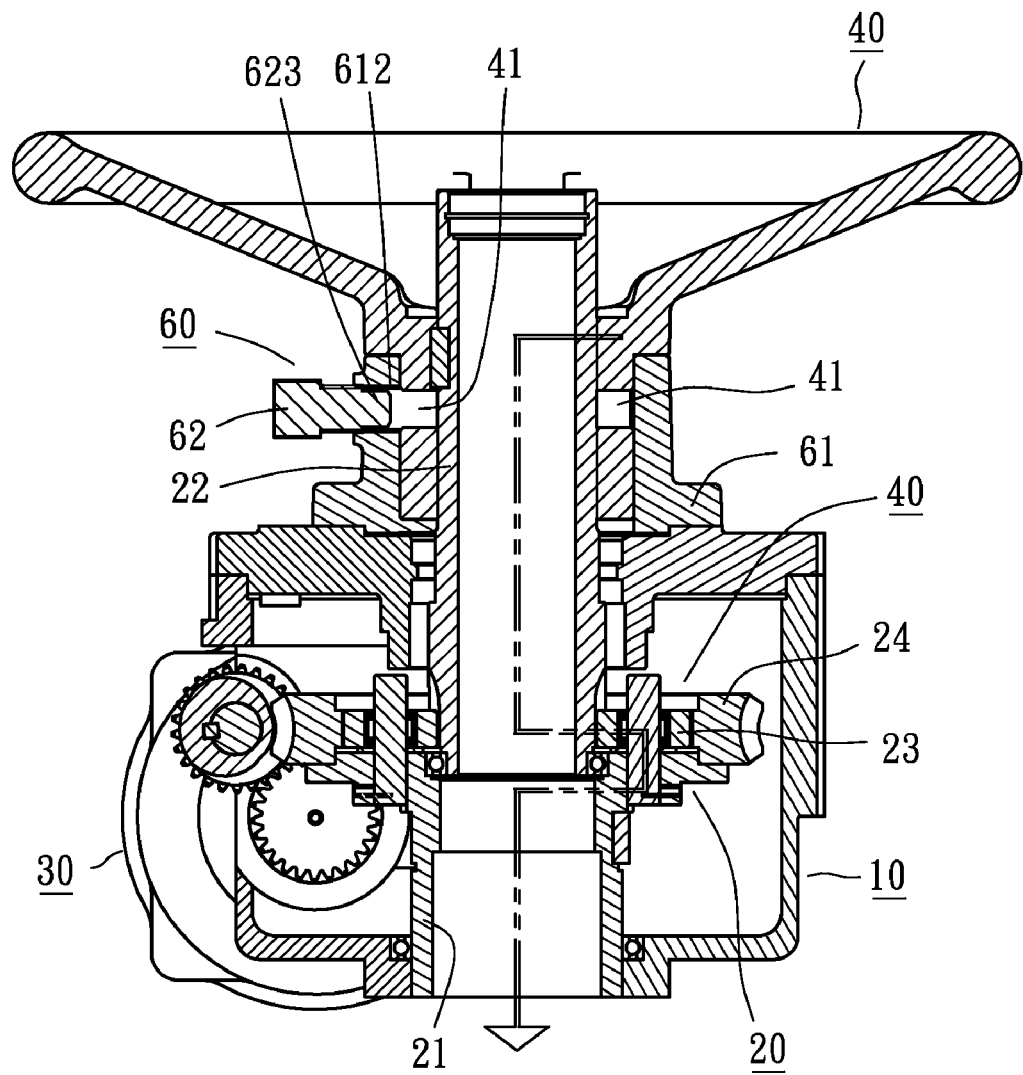

FIGS. 28 to 30 show the transmission operation of the present invention in the manual drive mode. In case that a blackout or failure of electrical system takes place and thus the electrical drive assembly 33 cannot operate, the present invention must be switched from the electrical drive mode to the manual drive mode to manually operate the valve body. In the manual drive mode, the gear ring 24 is fixed and unmovable. Under such circumstance, a user first pinches the embossed section 624 of the head section 621 of the switch rod 62 with his/her fingers to forcedly unscrew the switch rod 62 outward until the engagement section 623 is disengaged from the socket 41 of the hand wheel 40. Under such circumstance, the user can turn the hand wheel 40 to rotate the first transmission shaft 22. Simultaneously, the planetary gears 23 and the bracket 21 are driven and rotated to control opening/closing of the valve body connected under the bracket 21.

When restored to the electrical drive mode, the switch rod 62 is forcedly screwed inward to its home position where the engagement section 623 is again engaged in the socket 41 of the hand wheel 40.

The above embodiments are only used to illustrate the present invention, not intended to limit the scope thereof. Many modifications of the above embodiments can be made without departing from the spirit of the present invention.

What is claimed is:

1. An electrical drive apparatus for valves, comprising:
a main body having an internal first receiving space, a first opening being formed at a top section of the first receiving space, while a second opening being formed at a bottom section of the first receiving space, the first opening being sealed with a first cover body formed with a central through hole, a chamber being disposed on one side of the main body, the chamber having an internal second receiving space sealed with a second cover body;
a transmission unit including a bracket, a first transmission shaft, several planetary gears and a gear ring, the bracket having a tray section and a hub section downward extending from a bottom face of the tray section, a lower section of the hub section being rotatably disposed in the second opening of the main body, several pin members being arranged on a top face of the tray section in predetermined positions at intervals, a center of the top face of the tray section being formed with a support section, an outer gear section being formed on an outer circumference of a bottom section of the first transmission shaft, a locating section downward axially extending from the outer gear section, the locating section being rotatably located in the support section of the tray section, an upper section of the first transmission shaft extending through the through hole of the first cover body to an upper side thereof, the planetary gears being respectively rotatably fitted on the pin members and annularly engaged with the outer gear section of the first transmission shaft, the gear ring having an inner gear section on inner circumference and a spiral gear section on outer circumference, the planetary gears being engaged with the inner gear section of the gear ring;
a drive unit including a shaft member, a worm and an electrical drive assembly, the shaft member being installed in the chamber, the worm being fixedly mounted on a rear section of the shaft member and engaged with the spiral gear section of the gear ring, the electrical drive assembly serving to drive and rotate the shaft member;
a hand wheel fixed with a top section of the first transmission shaft, a lower section of the hand wheel being formed with several sockets; and
a switch unit for controlling whether the hand wheel and the first transmission shaft can be rotated so as to switch the electrical drive apparatus between an electrical drive operation mode and a manual drive operation mode.

2. The electrical drive apparatus for valves as claimed in claim 1, wherein the switch unit includes a base seat, a restriction seat, a clutch pull rod, a pull pin, a pull ring and a lock device, the base seat being fixedly disposed on a top section of the first cover body and formed with a central hole, the lower section of the hand wheel being rotatably disposed in the central hole, the base seat having a sleeve section outward extending from an outer circumference of the base seat corresponding to the sockets of the hand wheel, the sleeve section being formed with a large-diameter hole inward extending from an outer end face of the sleeve section by a predetermined depth, an inner wall of the large-diameter hole being further formed with an inward extending small-diameter hole in communication with the central hole corresponding to the sockets of the hand wheel, an inner threaded section being formed on an outer section of the large-diameter hole, the restriction seat having a tray section, a first block section and a second block section being symmetrically disposed on a left end face of the tray section in parallel to each other, the first and second block sections defining therebetween a first notch, two second notches being respectively symmetrically formed on middle sections of left end faces of the first and second block sections, a threaded hub section axially extending from a right end face of the tray section, the threaded hub section being formed with a passage axially leftward extending from a right end face of the threaded hub section in communication with the first notch, a nut being screwed on a left section of the threaded hub section and then the threaded hub section being screwed into the inner threaded section, the clutch pull rod having a large-diameter section, a first small-diameter section axially extending from a left side of the large-diameter section and a second small-diameter section axially extending from a right side of the large-diameter section, a left section of the first small-diameter section being formed with a vertically extending through hole, a compression spring being fitted around the first small-diameter section of the clutch pull rod, the clutch pull rod being installed in the large-diameter hole of the base seat, a left end of the compression spring abutting against the right end face of the restriction seat, while a right end of the compression spring abutting against a left end face of the large-diameter section, via the resilient force of the compression spring, the second small-diameter section of the clutch pull rod passing through the small-diameter hole of the base seat to plug into one of the sockets of the hand wheel, the pull pin being positioned in the first notch of the restriction seat, the pull pin being inserted and located in the through hole of the clutch pull rod.

3. The electrical drive apparatus for valves as claimed in claim 2, wherein the pull ring has two free ends, the two free ends of the pull ring being respectively fixed with a top end and a bottom end of the pull pin, the first and second block bodies of the restriction seat being formed with symmetrical lock holes, the lock device being passed through the lock holes and locked with the restriction seat and positioned on a left side of the pull pin.

4. The electrical drive apparatus for valves as claimed in claim 1, wherein the switch unit includes a base seat and a switch rod, the base seat being fixedly disposed on the top section of the first cover body and formed with a central hole, the lower section of the hand wheel being rotatably disposed in the central hole, the base seat being formed with a threaded hole corresponding to the sockets of the hand wheel, the switch rod having a head section, a threaded section rightward axially extending from the head section and an engagement section rightward axially extending from the threaded section, an outer circumference of the head section being formed with an embossed section, the threaded section being screwed in the threaded hole of the base seat, the engagement section being inserted in one of the sockets of the hand wheel.

\* \* \* \* \*